United States Patent [19]

Hirasawa et al.

[11] Patent Number: 4,485,347
[45] Date of Patent: Nov. 27, 1984

[54] DIGITAL FSK DEMODULATOR

[75] Inventors: Shigeichi Hirasawa; Akira Horiguchi, both of Kobe, Japan

[73] Assignee: Mitsubishi Denki Kabushiki Kaisha, Tokyo, Japan

[21] Appl. No.: 293,266

[22] Filed: Aug. 17, 1981

[30] Foreign Application Priority Data

Sep. 4, 1980 [JP] Japan .................................. 55-123045
Sep. 4, 1980 [JP] Japan .................................. 55-123046
Sep. 4, 1980 [JP] Japan .................................. 55-123049

[51] Int. Cl.$^3$ ......................... H03D 3/18; H04L 27/14
[52] U.S. Cl. ...................................... 329/50; 329/122; 375/82; 375/88
[58] Field of Search ......................... 329/50, 122, 126; 375/45, 81, 82, 88, 90, 120

[56] References Cited

U.S. PATENT DOCUMENTS

| 3,449,691 | 6/1969 | Pasternack et al. | |
|---|---|---|---|
| 3,611,298 | 10/1971 | Jacobson | 375/45 |
| 3,614,639 | 10/1971 | Belman | 329/126 X |
| 3,660,771 | 5/1972 | Balugani et al. | 329/126 X |
| 3,949,313 | 4/1976 | Tamada et al. | 329/126 X |
| 4,190,802 | 2/1980 | Levine | 329/126 X |
| 4,345,211 | 8/1982 | Longworth | 329/50 |

FOREIGN PATENT DOCUMENTS

| 2759259 | 7/1979 | Fed. Rep. of Germany | 329/50 |
|---|---|---|---|
| 56-36253 | 4/1981 | Japan | 375/82 |

OTHER PUBLICATIONS

Grzegorek, Z. et al., "Digital FSK Receiver has Small Delay", Electronic Engineering, v. 49, N. 592, May 77, p. 25.
R. J. McAulay, "The Effect of Staggered PRF's on MTI Signal Detection", IEEE Transactions on Aerospace and Electronic Systems, Jul. 1973, pp. S15–S18.
G. Pasternack et al., "Analysis and Synthesis of a D-PLL for FM Demodulation", Bell System Technical Journal, Dec. 1968, pp. 2207–2237 (missing pp. 2222 and 2223).

Primary Examiner—Stanley D. Miller
Assistant Examiner—W. R. Paxman
Attorney, Agent, or Firm—Wenderoth, Lind & Ponack

[57] ABSTRACT

The disclosed FSK demodulator includes a digital PLL for converting an FSK modulated input signal with two different frequencies to rectangular waveforms having durations as determined by those frequencies, two reversible N bit counters for counting clock pulses to determine instantaneous duty factors in the form of N parallel bits of the waveforms for each pulse repetition period, and a read only memory for multiplying alternate outputs, except for the sign bit, from the counters by a ratio of the lower to the higher frequency of the input signal. Then, a digital first-order low-pass filter removes a high frequency component from the output of the read only memory, resulting in a demodulated binary signal. The binary signal may be produced by setting or resetting a FLIP-FLOP when the sign bit from each of the counters is respectively a binary ONE or ZERO. Alternatively, another reversible M bit counter (when $M>N$) may count the clock pulses to equal the output from the read only memory.

4 Claims, 12 Drawing Figures

DIGITAL FSK DEMODULATOR

BACKGROUND OF THE INVENTION

This invention relates to a frequency shift keying demodulator, and more particularly to a modulated signal discrimination system used in a frequency shift keying demodulator having a digital phase locked loop circuit or a monostable multivibrator.

The term "frequency shift keying" implies a modulation process for transmitting data by employing different frequencies in accordance with the type of data to be transmitted and is abbreviated as "FSK". For example, for binary data having binary values of ONE and ZERO respectively, binary ONE data is transmitted by a high frequency signal while binary ZERO data is transmitted by a low frequency signal. Thus, the transmitted signal is formed of high frequency signal portions alternating with low frequency signal portions and is converted to corresponding rectangular waveforms on the receiving side. The receiving side is provided with a phase locked loop (which is abbreviated "PPL") for demodulating the received rectangular waveforms to the original data having values of binary ONE and ZERO respectively.

In a conventional PLL, a received FSK input signal has been matched in impedance and limited in bandwidth by a combined line transformer and receiver filter circuit and is adjusted so as to have a predetermined constant amplitude by means of an automatic gain control circuit (which is abbreviated "AGC"). Subsequently, an output from the AGC circuit has been supplied to a limiter where it is shaped into rectangular waveforms having transitions at zero crossings of the output of the AGC circuit. The shaped rectangular waveforms have been supplied to a digital phase locked loop circuit (which is abbreviated "DPLL") where the rectangular waveforms are converted to an output signal having two duty factors as determined by a high and a low frequency of the FSK input signal. Then, the output signal from the DPLL has been supplied to a base-band low-pass filter where it is converted to a base band signal with its high frequency component cut off after which the base band signal is sliced at a predetermined constant threshold by a threshold decision circuit resulting in a demodulated data signal.

Conventional FSK demodulators, such as that described above, have been disadvantageous in that the base band low-pass filter must be of a high quality and must have an excellent cutoff characteristic and the threshold decision circuit is unstable due to drifts resulting from variations in temperature and source voltage and is therefore required to be adjusted.

SUMMARY OF THE INVENTION

Accordingly, it is an object of the present invention to provide a new and improved FSK demodulator which is inexpensive and is excellent in stability and not subject to drifts resulting from variations in temperature and source voltage.

The present invention provides a frequency shift keying (FSK) demodulator comprising a rectangular waveform conversion circuit for converting a frequency shift keying modulated input signal to a rectangular waveform, a digital phase locked loop circuit (DPPL) for generating pulses in synchronism with a phase of an output from the rectangular waveform conversion circuit and having pulse widths which relate to a high and a low frequency of the input signal, a clock pulse generator circuit for generating a train of clock frequency pulses having a predetermined pulse repetition period, a first reversible counter for counting the clock pulses in an up direction when a pulsed output from the digital phase locked loop circuit is at a high level and for counting in a down direction when the output from the digital phase locked loop circuit is at a low level, the clock pulses being counted between the leading edge of each clock pulse outputted and that of the next succeeding pulse outputted, and a second reversible counter for counting the clock pulses in the down direction when the output from the DPLL circuit is at a low level and in the up direction when the output from the DPLL circuit is at a high level, the clock pulses being counted between the trailing edge of each clock pulse outputted and that of the next succeeding pulse outputted. The demodulator further comprises a register for alternately registering outputs from the first and second reversible counters, a read only memory for multiplying an output from the register by a ratio of the low to the high frequency of the input signal, and a digital low-pass filter for removing a high frequency component from an output from the read only memory.

Alternatively, the demodulator may further comprise a FLIP-FLOP circuit which is responsive to a sign bit of a binary ONE value from each of the first and second reversible counters so as to be set and which is responsive to a sign bit of a binary ZERO value so as to be reset.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1A:
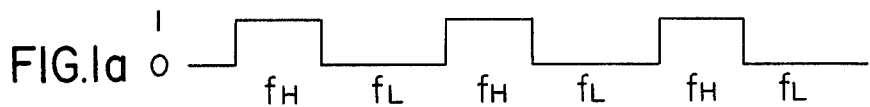
FIGS. 1(a)-(c) are waveforms useful in explaining the principles of the FSK technique.
Figure 1B:
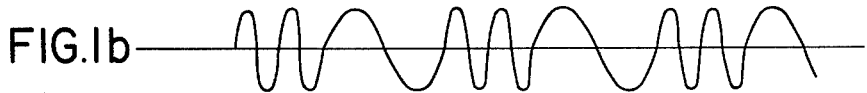
Figure 1C:
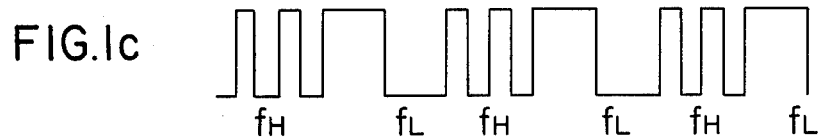

Referring now to FIG. 1 of the drawings, there are illustrated, by way of example, waveforms developed in the FSK technique. When the FSK technique is used to transmit data having values of a binary ONE alternating with values of a binary ZERO as shown by the waveform in FIG. 1(a), binary ONE data is transmitted with a signal having a high frequency $f_H$ while binary ZERO data is transmitted with a signal having a low frequency $f_L$. Therefore, the transmitted signal is formed of high frequency signal portions alternating with low frequency signal portions as shown by the waveform in FIG. 1(b). On the receiving side, the high frequency signal portion is converted to rectangular waveforms which are short in duration while the low frequency signal portion is converted to rectangular waveforms which are long in duration as shown by the waveform in FIG. 1(c). The receiving side is provided with a DPLL circuit for demodulating the waveform shown in FIG. 1(c) to the original data or the waveform in FIG. 1(a).

Figure 2:
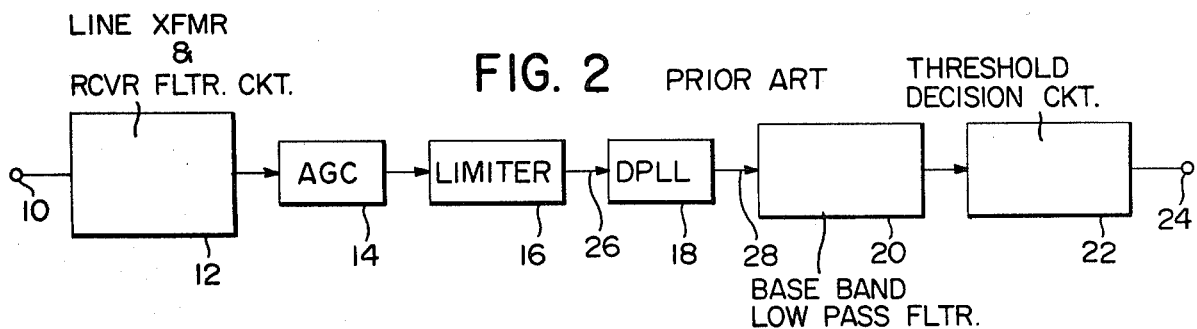
FIG. 2 is a block diagram of a conventional FSK demodulator.

As shown in FIG. 2, a conventional DPLL comprises an input 10, a combined line transformer and receiver filter circuit 12, an AGC circuit 14, a limiter 16, a DPLL circuit 18, a base band low-pass filter 20, a threshold decision circuit 22 and an output 24 connected sequentially in the named order.

The DPLL circuit 18 is well known in the art because it is disclosed, for example, in G. Pasternack and R. L. Whalin "Analysis and Synthesis of a Digital Phase-Locked Loop for FM Demodulation" Bell System Technical Journal December, 1968, pages 2207-2237.

Figure 3A:
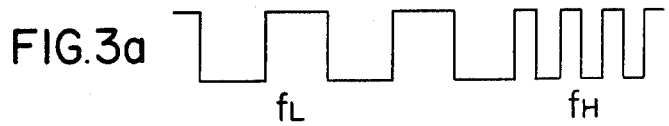
FIGS. 3(a)-(b) are graphs illustrating waveforms of an input signal to and an output signal from the DPLL circuit shown in FIG. 2.
Figure 3B:
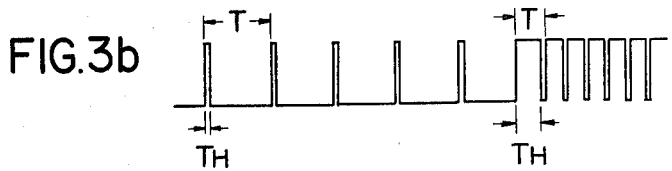

In operation, a received FSK modulated input signal is supplied to the input 10 and processed in the manner as described above until a demodulated data signal is developed at the output 24. For example, FIG. 3(a) shows a waveform representing an output signal 26 from the limiter 16 which is supplied to the DPLL circuit 18 and the waveform shown in FIG. 3(b) represents an output signal 28 from the DPLL circuit 18. The output signal 26 is formed of a series of rectangular waveforms shown in FIG. 3(a) and is converted to the output signal 28 having two different duty factors $d_H$ and $d_L$ as determined by the frequencies $f_H$ and $f_L$ respectively as shown by the waveform in FIG. 3(b). As is well known, the duty factor is defined by a ratio of a pulse duration $T_H$ to a pulse repetition period T of the pulse (see the waveform in FIG. 3(b)). As shown in FIGS. 3(a)-(b), the high frequency signal portion of the signal 28 has a relatively long duration while the low frequency signal portion thereof has a relatively short duration.

Conventional FSK demodulators such as that described above have been disadvantageous in that the base band low-pass filter 20 must be of a high quality and having an excellent cutoff characteristic and the threshold decision circuit 22 is unstable due to drifts resulting from variations in temperature and source voltage and is therefore required to be adjusted.

The present invention eliminates the disadvantages of the prior art practice, as described above, by the provision of an FSK modulator capable of generating a demodulated data signal entirely digitally by estimating a value of a duty factor of an output signal from the DPLL circuit which has been momentarily changed during each pulse repetition period of the output signal for each of the leading and trailing edges of the pulses thereof and, through the high speed sampling of that output signal and the counting of the clock pulses, storing the estimated value as an instantaneous duty factor and supplying the stored instantaneous duty factor to a digital first-order low-pass filter and then slicing an output from the filter.

Alternatively, the digital first-order low-pass filter may be replaced by a FLIP-FLOP circuit which is set or reset in response to a sign bit which is either a binary ONE or ZERO from each of a first and a second reversible counter having stored therein the instantaneous duty factor as described above.

Figure 4:
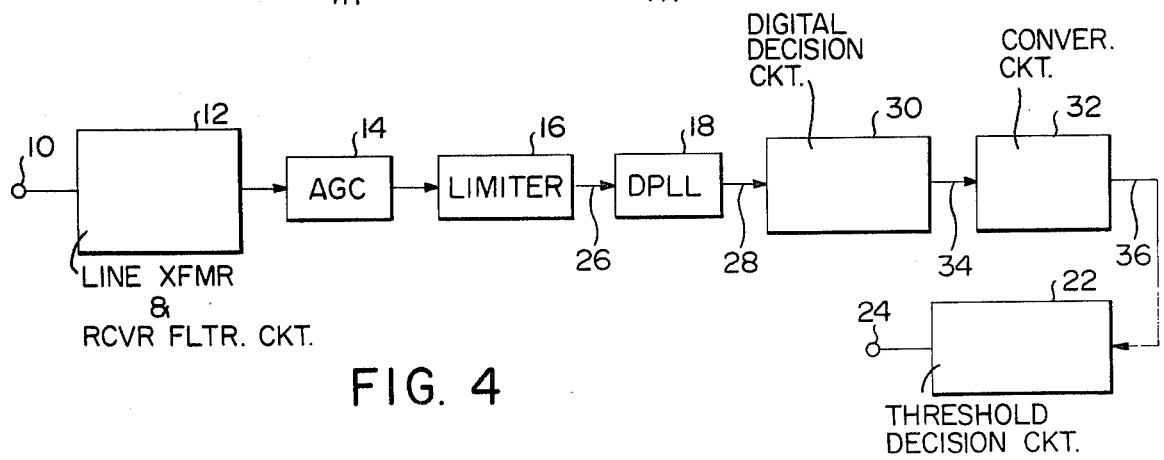
FIG. 4 is a block diagram of one embodiment according to the FSK demodulator of the present invention.

Referring now to FIG. 4, wherein like reference numerals designate components which are identical to those shown in FIG. 2, there is illustrated one embodiment according to the FSK demodulator of the present invention. The illustrated arrangement is different from that shown in FIG. 2 only in that in FIG. 4, a series combination of a digital decision circuit 30 and, a converter circuit 32 is connected between the DPLL circuit 18 and the threshold decision circuit 22.

The digital decision circuit 30 receives the output signal 28 from the DPLL circuit 18 to determine the duty factor thereof through high speed sampling and pulse counting. The converter circuit 32 is supplied with an output signal 34 from the digital decision circuit 30 and converts the output 34 to its corresponding DC components by considering the pulse repetion period of the output signal 28 from the DPLL circuit 18 since the signal 28 has two different frequencies $f_L$ and $f_H$. The threshold decision circuit 22 includes a digital first-order filter (not shown in FIG. 4).

In other respects, the arrangement of FIG. 4 is identical in operation to that shown in FIG. 2.

Figure 5:
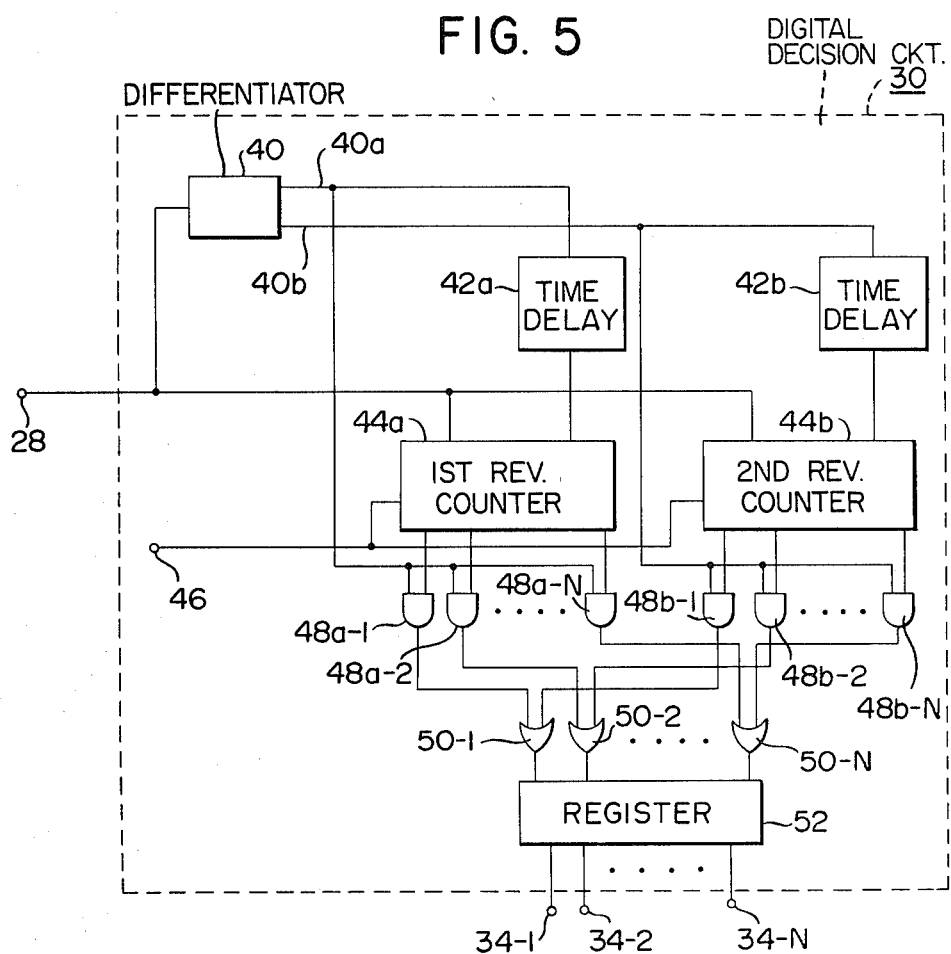
FIG. 5 is a block diagram of the details of the digital decision circuit shown in FIG. 4.

The digital decision circuit 30 is preferably of a circuit configuration as shown in FIG. 5. The illustrated arrangement comprises a differntiator circuit 40, which is responsive to each of the leading edges of the pulses of the signal at 28 from the DPLL circuit 18 (not shown in FIG. 5), so as to generate an output pulse 40a and is also responsive to each of the trailing edges thereof to generate an output pulse 40b. The output pulses 40a and 40b are supplied to respective time delay circuits 42a and 42b so as to be given a common predetermined constant time delay. Delayed outputs from the time delay circuits 42a and 42b are respectively supplied to a pair of first and second reversible N bit counters 44a and 44b to which the output signal at 28 and a train of clock pulses 46 are also supplied. Each of the reversible N bit counters 44a or 44b is connected to one input of each of N "AND" gates 48a-1, 48a-2, . . . , 48a-N or 48b-1, 48b-2, . . . , 48b-N. The "AND" gates 48a-1, 48a-2, . . . , 48a-N have their other inputs supplied with the output pulse 40a from the differentiation circuit 40 and have their outputs connected to one input of each of N "OR" gates 50-1, 50-2, . . . , 50-N and the "AND" gates 48b-1, 48b-2, . . . , 48b-N have their other inputs supplied with the output pulse 40b from the differentiation circuit 40 and have their outputs connected to the other inputs of the "OR" circuits 50-1, 50-2, . . . , 50-N. The outputs of those OR circuits are connected to a register 52 for alternately registering counts stored in the first and second reversible N bit counters 44a and 44b. The register 52 has N outputs forming an output signal in the form of N parallel bits forming an output signal in the form of N parallel bits 34-1, 34-2, . . . , 34-N.

Figure 7:
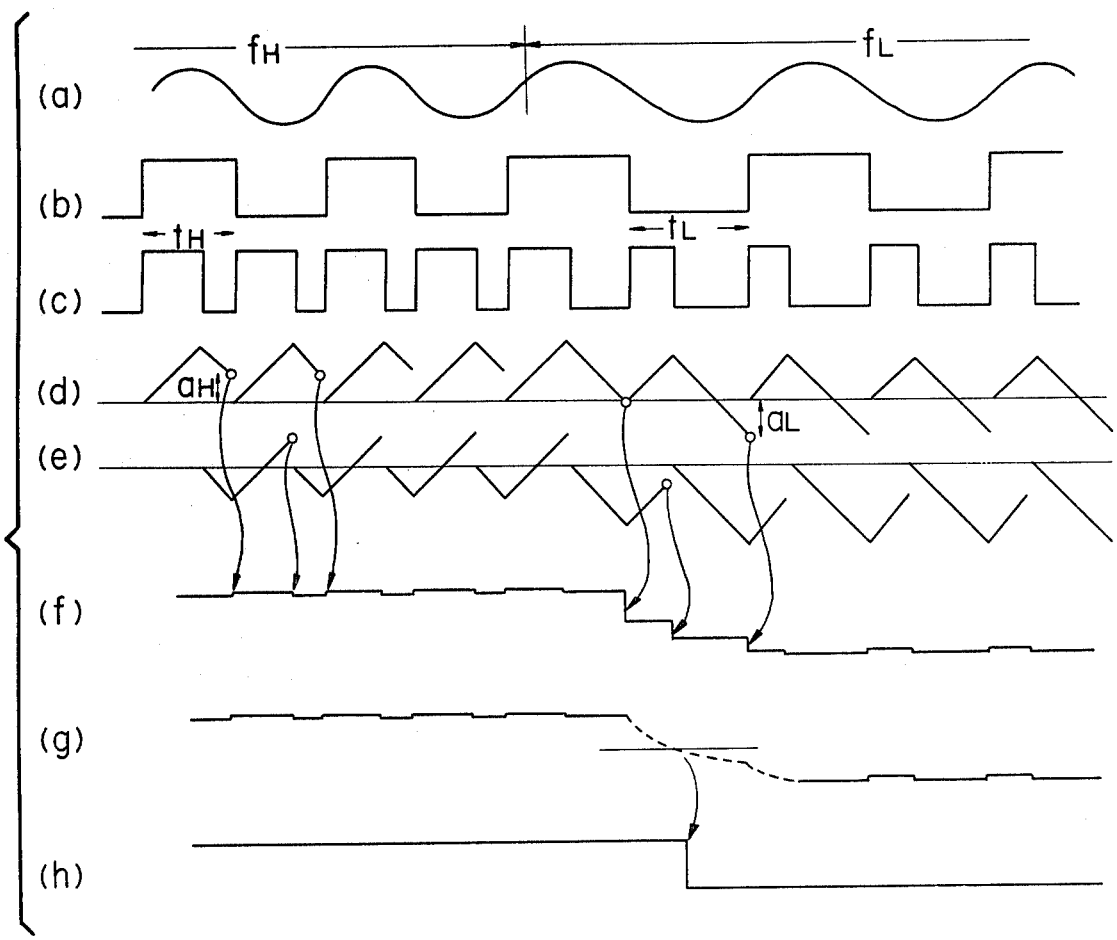
FIGS. 7(a)-(h) are graphs illustrating waveforms developed at various points in the arrangements shown in FIGS. 4, 5 and 6.

The operation of the arrangement shown in FIG. 5 will now be described. The first reversible N bit counter 44a counts the clock pulses 46 in an up direction when the output signal 28 from the DPLL circuit 18 is a binary ONE or at its high level and counts in a down direction when that output signal 28 is a binary ZERO or at its low level. The clock pulses are counted between the leading edge of each pulse of the output 28 and that of the next succeeding pulse thereof (see the waveform in FIG. 7(d)) and for each of those leading edges, the first reversible counter 44a is reset with a delayed pulse from the time delay circuit 42a through which the rise pulse 40a has passed so that the first reversible counter 44a counts up to a value corresponding to the instantaneous duty cycle of the pulsed output signal 28 for each pulse repetition period thereof. The second reversible counter 44b is operated in the same manner as the first reversible counter 44a both shifted by one half the pulse repetition period. That is, the second reversible counter 44b counts the clock pulses 46 in the down direction when the output signal 28 is at the low level and counts in the up direction when the output signal 28 is at the high level. In this case, the clock pulses are counted between the trailing edge of each pulse of the output signal 28 and that of the next succeeding pulse thereof (see the waveform in FIG. 7(e)). Then, the counted values from the first and second reversible counters 44a and 44b are alternately supplied to the register 52 through the associated "AND" gates and the OR gates and alternately registered in the register 52 for each half of the pulse repetition period of the output signal 28.

It is assumed that the output signal 28 from the DPLL circuit 18 has a pulse repetition rate f and a duty factor d, either of the reversible counters 44a or 44b has its content m after the complete pulse repetition period, and the clock pulses have a pulse repetition frequency $f_c$, with an output DC component designated by e. Under the assumed conditions:

$$m = df_c/f - (1-d)f_c/f = (2d-1)f_c/f$$

$$e \propto d = (mf/2f_c) + 0.5$$

From these expressions it is seen that, assuming that $f_c$ is constant, m changes with f even though the duty factor d remains unchanged and mf is proportional to d. Therefore, d is determined by dividing m by $t = 1/f$. This division is accomplished by a read only memory including a decoder as will subsequently be described in conjunction with FIG. 6. Since the conversion or the abovementioned division is required to hold the correspondence of the counts on the counters with the duty factors of the output signal from the DPLL circuit and be effected with respect to only either one of the frequencies $f_L$ and $f_H$ of the FSK modulated signal 10, a sign bit included in an N bit output 34-1, 34-2, ..., 34-N from the register 52 can be used to decide whether or not the conversion is required.

Figure 6:
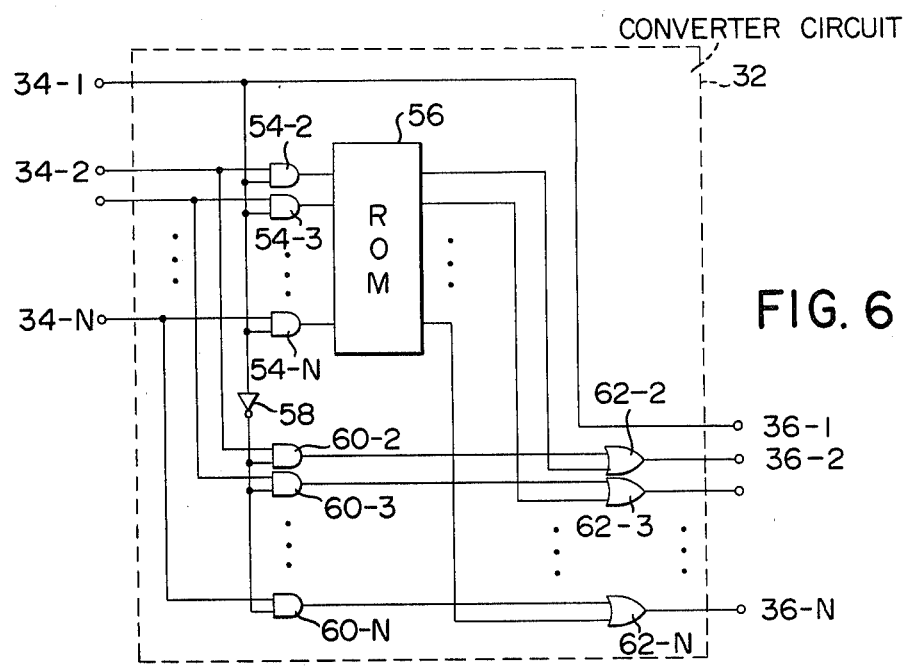
FIG. 6 is a block diagram of the details of the converter circuit shown in FIG. 4.

The converter circuit 32 is preferably of a circuit configuration as shown in FIG. 6. In the illustrated arrangement, (N−1) "AND" gates 54-2, 54-3, ..., 54-N have one input which is supplied with the sign bit 34-1 of the N bit output signal from the register 52, and the other inputs thereof supplied with the (N−1) bits 34-b, ..., 34-N of that output signal and have their outputs connected to a read only memory 56. The read only memory 56 includes a decoder (not shown) for multiplying (N−1) bits 34-2, ..., 34-N except for the sign bit 34-1 from the register 34 by a ratio of $f_L/f_H$. The sign bit 34-1 is also supplied via a "NOT" gate 58 to one input of (N−1) "AND" gates 60-2, 60-3, ... 60-N which have their inputs respectively connected to the (N−1) bits 34-2, 34-3, ..., 34-N. The "AND" gates 60-2, 60-3, ..., 60-N have outputs connected to one input of (N−1) "OR" gates 62-2, 62-3, ..., 62-N, which have their other inputs respectively connected to (N−1) bit outputs of the read only memory 56. The sign bit 34-1 included in the N bit output signal 34 is connected as one output of the converter circuit 32 and the (N−1) "OR" gates 62-2, 62-3, ..., 62-N are connected as the other respective outputs. Thus, the converter circuit 32 has N bit outputs and a converted N bit output signal is developed in the form of N parallel bits 36-1, 36-2, ..., 36-N.

FIGS. 7(a)-(h) show waveforms developed at various points in the arrangement shown in FIGS. 4, 5 and 6 on a time axis which is enlarged as compared with FIGS. 1 and 3. The waveforms shown in FIGS. 7(a), 7(b) and 7(c) correspond to the waveform shown in FIG. 3(b) respectively and respectively whoe the FSK modulated signals 10, and the pulsed input signal 26 to and the pulsed output signal 28 from the DPLL circuit 18.

Each of the reversible counters 44a or 44b counts the clock pulses 46 to provide a count corresponding to the instantaneous duty factor of the pulsed output signal 28 for each pulse repetition period thereof as described above and as shown by the waveforms shown in FIGS. 7(d) or (e). The register 52 alternately registers the respective counts on the reversible counters 44a and 44b and delivers the output signal 34 as shown by the waveform shown in FIG. 7(f).

The register 52 holds the instantaneous factor thus converted and continuously changed for each sampling of the register 52. However, the change in instantaneous duty factor is extremely slow as shown by the waveform shown in FIG. 7(f) and is sufficiently deprived of a high frequency component at the output of register 52. Therefore, the output 36 from the register 52 can easily be smoothed into the waveform shown in FIG. 7(g) by a digital first-order low-pass filter as will be subsequently described. At that time, the sign bit at the most significant bit position is used to produce the demodulated data signal 24. The use of such a first-order low-pass filter results in excellent characteristics with respect to code distortion and errors.

Figure 8:
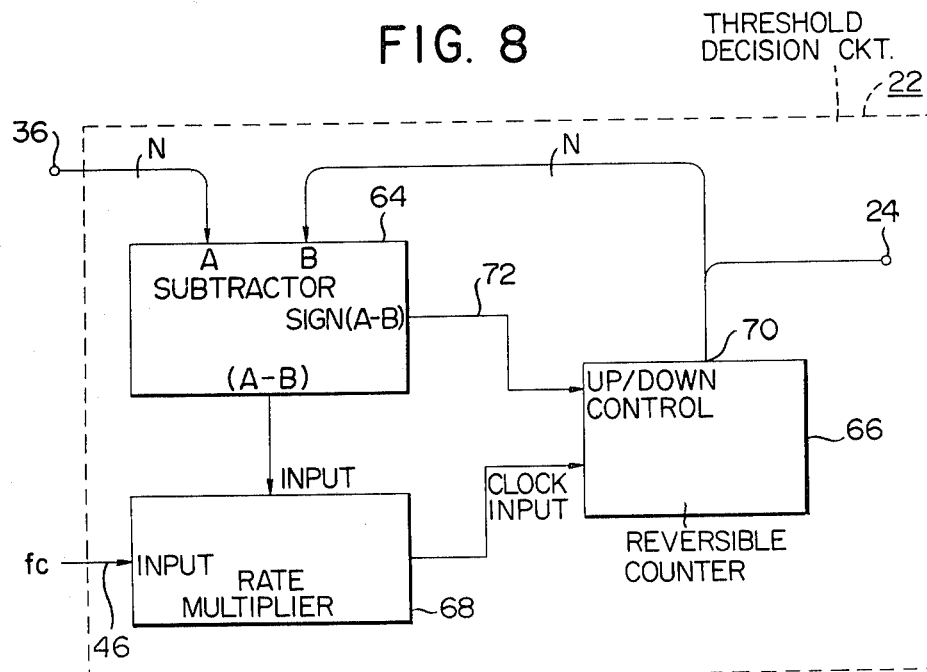
FIG. 8 is a block diagram of the details of the threshold decision circuit shown in FIG. 4.

The threshold decision circuit 22 is preferably of a circuit configuration as shown in FIG. 8. The illustrated arrangement comprises a subtractor 64 having a pair of inputs A and B and a pair of outputs SIGN (A−B) and |(A−B)|. The input A receives the output signal 36 in the form of N parallel bits from the converter circuit 32 and the input B is connected to an output of a reversible counter 66 where the demodulated data signal 70 is developed in the form of N parallel bits. The output SIGN (A−B) of the subtractor 64 is connected to an up/down control input of the reversible counter 66 and the output |(A−B)| thereof is connected to a rate multiplier 68 which is also supplied with the clock pulses 46. The rate multiplier 68 has an output connected to a clock input of the reversible counter 66.

The rate multiplier 68 may be the commercially available SN 7497 from Texas Instruments.

The arrangement of FIG. 8 forms a digital first-order low-pass filter. Thus, the threshold decision circuit 22 is formed of the digital first-order low-pass filter.

In operation, the subtractor 64 subtracts an N parallel bit output signal 70 delivered by the reversible counter 66 from the N parallel bit output signal 36 and delivers the absolute value of a difference therebetween to the rate multiplier 68. The subtractor 64 also delivers a sign output 72 to the up/down control input of the reversible counter 66. When the output signal 36 is greater than the output signal 70, the sign output 72 is a binary ONE, but when the output signal 36 is not greater than the output signal 70, the sign output 72 is a binary ZERO. When a binary ONE sign output 72 is supplied to the up/down control input of counter 66, the reversible counter 66 counts the clock pulses supplied to its clock input in the up direction. However, when a binary ZERO sign output 72 is supplied to its up/down control input, the reversible counter 66 counts those clock pulses in the down direction.

Assuming that the rate multiplier 68 has a clock input frequency $f_c$ and an output frequency f, and x(t) and y(t) respectively designate the N bit output signals 36 and 70, then the output f from the rate multiplier 68 may be expressed by $$f = \frac{|x(t) - y(t)|}{2^N} \cdot f_c \qquad (1)$$

Then, the reciprocal of the expression (1) is $$\Delta t = \frac{2^N}{|x(t) - y(t)|} \cdot t_c \qquad (2)$$

where $\Delta t$ and $t_c$ respectively designate the reciprocals of f and $f_c$.

Then, the reversible counter 66 is responsive to the sign output 72 from the subtractor 64 to count a binary ONE in the up or down direction for each incremental time $\Delta t$ expressed by the expression (2), and the N bit output 70 from the reversible counter 66 increases or decreases by a binary ONE for each incremental time $\Delta t$ expressed by $$\Delta t = \frac{2^N}{x(t) - y(t)} \cdot t_c \qquad (3)$$

Assuming that $$\tau = 2^N t_c \qquad (4)$$

defines a time constant $\tau$ of the reversible counter 66, the expression (3) may be reduced to $$\Delta t = \tau \frac{1}{x(t) - y(t)} \qquad (5)$$

Also, the N bit output signal 70 from the reversible counter 66 can change stepwise by only a binary ONE. By expressing this change by $\Delta y$, the expression (5) may be transformed to $$\Delta t = \tau \frac{\Delta y}{x(t) - y(t)} \qquad (6)$$

and then to $$\frac{\Delta y}{\Delta t} = \frac{1}{\tau} \{x(t) - y(t)\} \qquad (7)$$

When $\Delta t$ and therefore $\Delta y$ is of a sufficiently small value, the expression (7) may be rewritten as $$\frac{dy}{dt} = \frac{1}{\tau} \{x(t) - y(t)\} \qquad (8)$$

Assuming that, by utilizing the Laplace transformation technique, X(s) and Y(s) designate the Laplace transformations of x(t) and y(t) respectively, and therefore:

$$Y(s) = \frac{1}{\tau s + 1} X(s) \qquad (9)$$

Thus, the resulting transfer function H(s) may be expressed by $$H(s) = \frac{Y(s)}{X(s)} = \frac{1}{\tau s + 1} \qquad (10)$$

which gives a transfer function of a first-order low-pass filter as is well known in the art.

From the foregoing it is seen that the N bit output signal 70 is equivalent to a first-order low-pass filtering of the N bit output signal 36 from the converter circuit 32.

Figure 9:
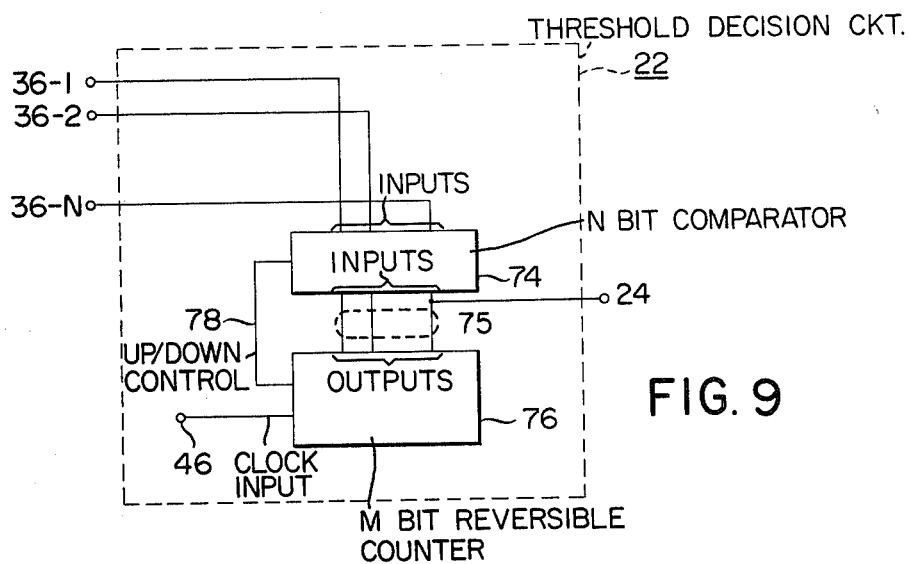
FIG. 9 is a diagram similar to FIG. 8 but illustrating a modification of the arrangement shown in FIG. 8.

The threshold decision circuit 22 may be also of a circuit configuration as shown in FIG. 9. The illustrated arrangement comprises an N bit comparator circuit 74 which is supplied with the N parallel bit 36-1, 36-2, . . . , 36-N of the output signal 36 from the converter circuit 32 and an M bit reversible counter 76 connected to the comparator circuit 74 through N leads and another lead labelled with reference numeral 78, where M is greater than N. The M bit reversible counter 76 is also supplied with the clock pulses 46 and supplies the output 24.

Assuming first that the output signal 75 from the reversible counter 76 is greater than the input signal 36 from the converter circuit 32, the comparator circuit 74 delivers a binary ZERO to the reversible counter 76 through the lead 78 to cause the latter to count the clock pulses 46 in the down direction. At the point in time when the output signal 75 is smaller than the input signal 36, the comparator circuit 74 delivers a binary ONE to the reversible counter 76 through the lead 78 to cause the latter to count the clock pulses 46 in the up direction until the output signal 75 exceeds the signal 36. At that time, the reversible counter 36 counts the clock pulses 46 in the down direction. The process as described above is repeated so that the input signal 36 is substantially equal to the output signal 75 resulting in a balanced state.

A change in input signal 36 causes the process as described above to be repeated.

Figure 10:
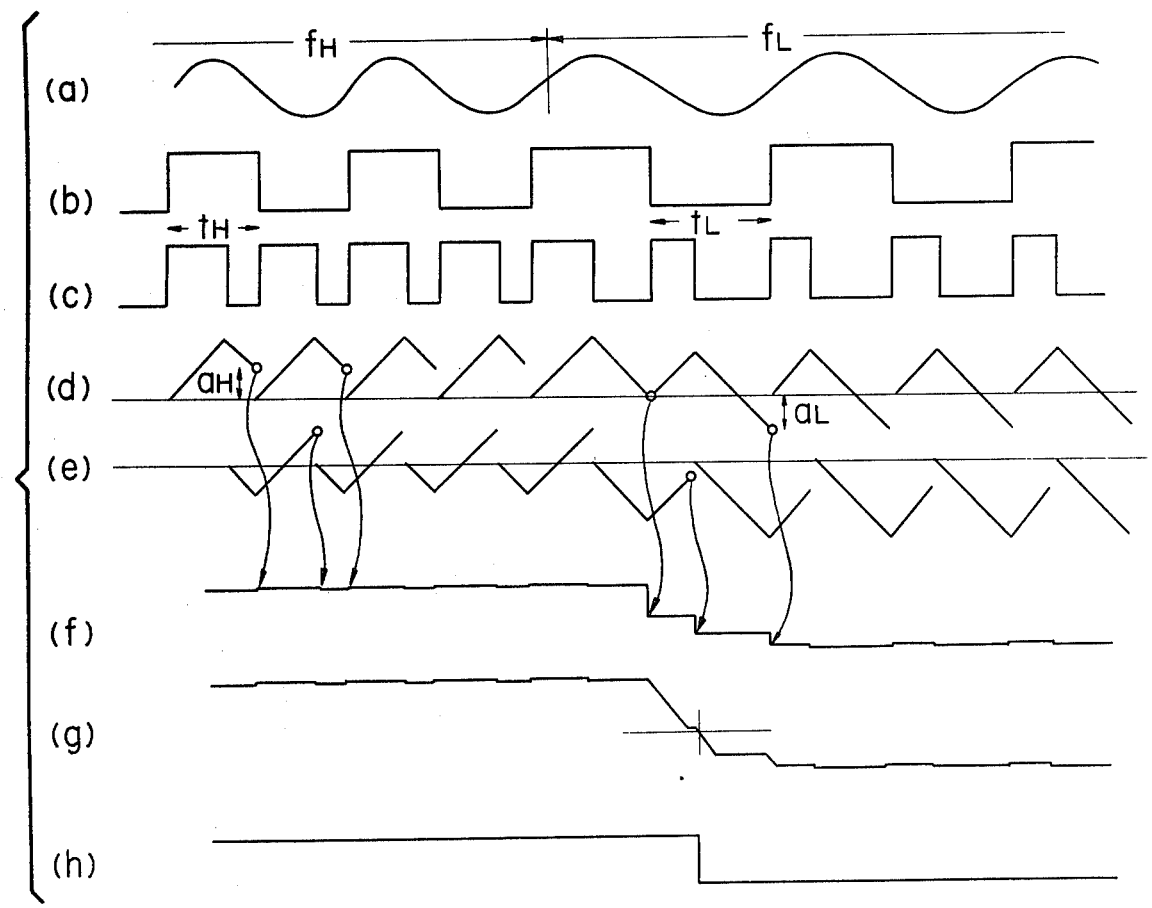
FIGS. 10(a)-(h) are graphs illustrating waveforms developed at various points in the arrangement shown in FIG. 9 along with associated waveforms.

FIGS. 10(a)-(h) show waveforms developed at various points in the arrangements shown in FIGS. 4, 5 and 9. Waveforms shown in FIGS. 10(a)-(f) are substantially indentical to the corresponding waveforms shown in FIGS. 7(a)-(f) but FIG. 10(g) is somewhat different from FIG. 7(g).

It is seen in the arrangement of FIG. 9 that the converted DC components 36 of the output signal 28 from the DPLL circuit 18 are linearly interpolated by a section of a straight line with a predetermined fixed time constant as determined by comparison of the signal 36 with the count on the reversible counter 76 as shown by the waveform in FIG. 10(g). In other words, when the DC component 36 is different from the count on the reversible counter 76, the latter is controlled so as to count the clock pulses 46 in the up or down direction as the case may be until the two are equal to each other. At that time a constant threshold is sensed, resulting in the demodulated data signal 28 as shown by the waveform in FIG. 10(h).

Figure 11:
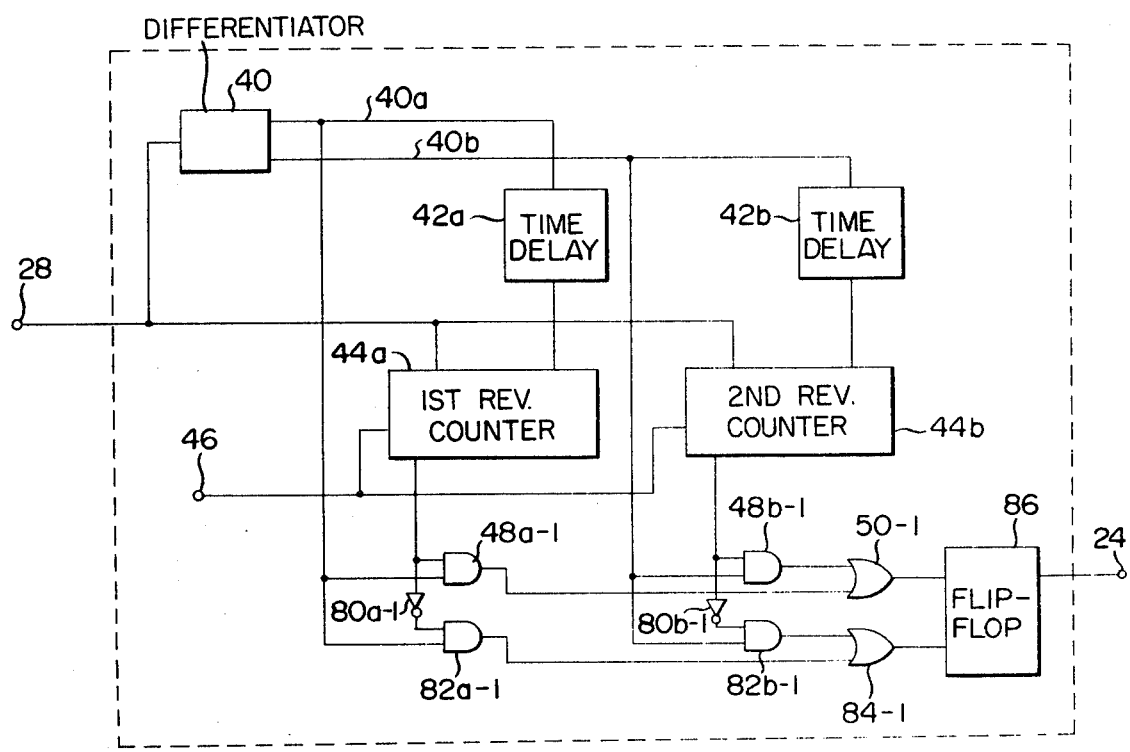
FIG. 11 is a block diagram of a modification of the arrangements shown in FIGS. 4, 6 and 8.

The digital decision circuit 30, the converter circuit 32 and the threshold decision circuit 22 as shown in FIG. 4 may be also combined together into a circuit configuration as shown in FIG. 11, wherein like reference numerals designate the components identical to those shown in FIG. 5. The illustrated arrangement is different from that shown in FIG. 5 only in that in FIG. 11, each of the N bit reversible counters 44a or 44b has its N bit output, for example, the first N bit output at the most significant bit position connected to one input of the "AND" gate 48a-1 or 48b-1, and also connected to one input of a "NOT" gate 80a-1 or 80b-1 whose output is subsequently connected to one input of an AND gate 82a-1 or 82b-1 having the other input supplied with the output 40a or 40b from the differentiation circuit 40 and an output connected via an OR circuit 84-1 to a FLIP-FLOP circuit 86 which has been substituted for the register 52 shown in FIG. 5. Then, the OR gates represented by the OR gate 50-1 are also connected to the the FLIP-FLOP circuit 86. It is noted in FIG. 11 that only one of each of the sets of "AND" and "OR" gates is shown for purposes of simplifying the illustration.

The FLIP-FLOP circuit 86 is arranged to be set or reset in dependence upon whether the sign bit from the most significant bit position of either of the N bit reversible counters 44a or 44b is a binary ONE or a binary ZERO, on the assumption that $(d_H + d_L)/2 = 0.5$ where $d_H$ and $d_L$ designate the instantaneous duty factors generated as described above in conjunction with FIG. 5. The most significant bit of the output from the FLIP-FLOP circuit 86 provides the output 24.

Figure 12:
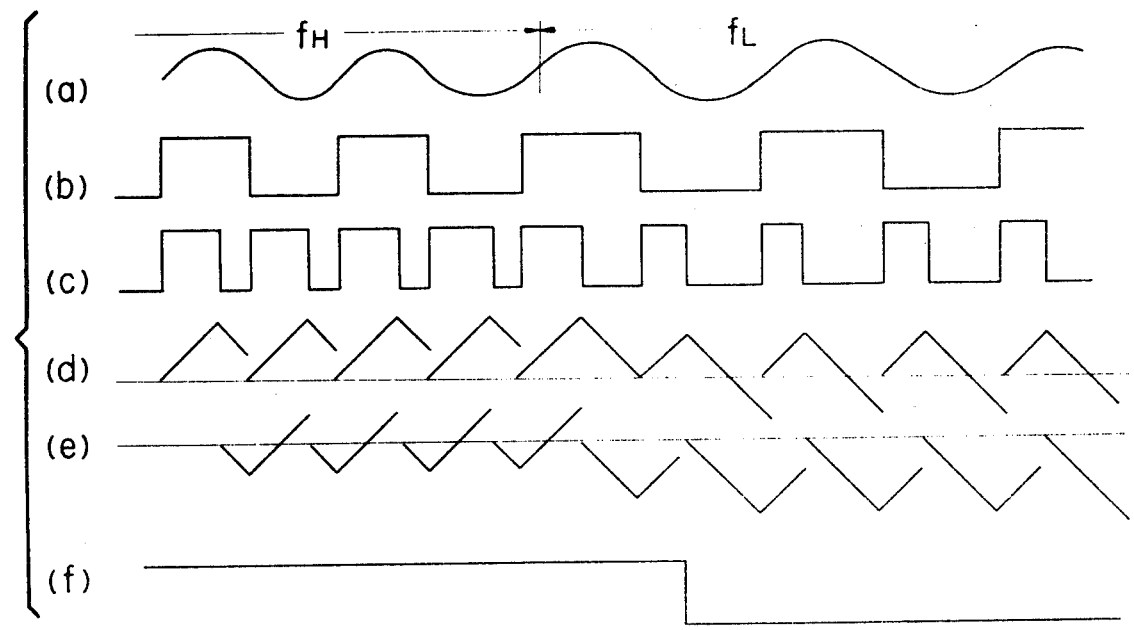
FIGS. 12(a)-(f) are graphs illustrating waveforms developed at various points in the arrangement shown in FIG. 11 along with associated waveforms.

From the foregoing it will readily be understood that, for the threshold of substantially 50%, the output 24 is a binary ONE when the output signal 28 from the DPLL circuit has a duty factor greater than a threshold of 50% whereas the output 24 is a binary ZERO when the duty factor is less than the threshold of 50%. This is shown by the waveform in FIG. 12(f), and the waveforms in FIGS. 12(c), (d) and (e) show the output signal 28, and the outputs from the reversible counters 44a and 44b; the waveforms in FIGS. 12(a) and (b) show the FSK modulated signal 10 and the input signal 26 supplied to the DPLL circuit 18. Therefore, an FSK demodulated data signal results.

It will also be readily understood that, if a carrier frequency $f_L$ or $f_H$ is sufficiently high as compared to a data signaling rate, the distortion of codes can be sufficiently small even though the utilization of the instantaneous decision system as described above. For example, for 300 bauds, it is possible to suppress the instantaneous distortion of codes to ±5% or less. Therefore, the instantaneous decision system can be put to practical use without any hindrance.

While the present invention has been illustrated and described in conjunction with a few preferred embodiments thereof, it is to be understood that numerous changes and modifications may be resorted to without departing from the spirit and scope of the present invention.

What is claimed is:

1. A frequency shift keying demodulator comprising a rectangular waveform converter circuit for converting a frequency shift keying modulated input signal having either a high frequency or a low frequency to a signal having a rectangular waveform, a digital phase locked loop circuit for generating pulses in synchronism with the phase of said rectangular waveform from said rectangular waveform converter circuit and having pulse widths relating to said high frequency and said low frequency of said input signal, a clock pulse generator circuit for generating a train of clock pulses having a predetermined pulse repetition period, a first reversible counter for counting said clock pulses in an up direction when a pulse output from said digital phase locked loop circuit is at a high level and for counting said clock pulses in a down direction when said output from said digital phase locked loop circuit is at a low level, said clock pulses being counted between a leading edge of each pulse of said pulse output and that of the next succeeding pulse thereof, a second reversible counter for counting said clock pulses in the down direction when said output from said digital phase locked loop circuit is at a low level and for counting said clock pulses in the up direction when said output from said phase locked loop circuit is at a high level, said clock pulses being counted between a trailing edge of each pulse of said pulse output and that of the next succeeding pulse thereof, a register for deriving first and second alternating outputs from said first and second reversible counters, a read only memory for multiplying said first output from said register by a ratio of said low frequency to said high frequency of said input signal, and a digital first-order low-pass filter for removing the high frequency component from an output of said read only memory, said low-pass filter supplying a demodulated signal output.

2. A frequency shift keying demodulator as claimed in claim 2, wherein said low-pass filter comprises a rate multiplier and a subtractor, and a third reversible counter, said subtractor determining the absolute value and the sign of the difference between said output from said read only memory and an output from said third reversible counter, said rate multiplier having said clock pulses at one input and said absolute value at a second input, said rate multiplier supplying a frequency changing output in accordance with said absolute value from said subtractor, said reversible counter counting said output from said rate multiplier in either an up direction or a down direction, said direction being controlled by said sign from said subtractor.

3. A frequency shift keying demodulator as claimed in claim 1, wherein said digital first-order low-pass filter comprises a third reversible counter for counting said clock pulses, and a comparator circuit for comparing the count in said third reversible counter with said output from said read only memory so as to cause said third reversible counter to count said clock pulses in a down direction when said count in said third reversible counter is greater than said output from said read only memory and to count said clock pulses in an up direction when said count in said third reversible counter is smaller than said output from said read only memory.

4. A frequency shift keying demodulator comprising a rectangular waveform converter circuit for converting a frequency shift keying modulated input signal having either a high frequency or a low frequency to a signal having a rectangular waveform, a digital phase locked loop circuit for generating at its output pulses in synchronism with the phase of said rectangular waveform from said rectangular waveform converter circuit and having pulse widths relating to said high frequency and said low frequency of said input signal, a clock pulse generator circuit for generating a train of clock pulses having a predetermined pulse repetition period, a first reversible N bit parallel counter for counting said clock pulses in an up direction when an output from said digital phase locked loop circuit is at a high level and for counting said clock pulses in a down direction when said output from said digital phase locked loop circuit is at a low level, said clock pulses being counted between a leading edge of each pulse of said output and that of the next succeeding pulse thereof, a second reversible N bit parallel counter for counting said clock pulses in the down direction when said output from said phase locked loop circuit is at a low level and for counting said clock pulses in the up direction when said output from said phase locked loop circuit is at a high level, said clock pulses being counted between a trailing edge of each pulse of said pulse output and that of the next succeeding pulse thereof, and a FLIP-FLOP circuit which is set when the sign bit in either of said first or second reversible N bit parallel counters has a binary ONE value and is reset when said sign bit has a binary ZERO value, the output of said FLIP-FLOP supplying a demodulated signal.

* * * * *